United States Patent Office 3,573,063
Patented Mar. 30, 1971

3,573,063
PROCESSES FOR IMPROVING THE FLAVOR, TENDERNESS, JUICINESS AND APPEARANCE OF MEATS USING NATURAL ANIMAL PRODUCTS
Beverly E. Williams, P.O. Box 299, San Mateo, Calif. 94401
No Drawing. Continuation-in-part of application Ser. No. 639,313, May 18, 1967. This application Dec. 31, 1969, Ser. No. 889,721
Int. Cl. A22c *18/00*
U.S. Cl. 99—107                           3 Claims

ABSTRACT OF THE DISCLOSURE

Naturally occurring animal products are stitch pumped into animal carcasses on or adjacent to the killing floor while the freshly slaughtered carcasses are still warm and flaccid and before the completion of rigor mortis and at pressures from 15 to 110 lbs. per square inch at animal body temperatures in amounts of up to 5% by weight of the animal carcass. These naturally occurring animal products may be whole blood from the aorta or arterial system of the animal itself; whole blood from a similar animal; rehydrated blood from a similar animal; milk; reconstituted milk from dried milk and water. A more tender, juicier meat of improved appearance and flavor results when cooked.

CROSS-REFERENCE TO RELATED APPLICATION

This application is a continuation-in-part of my application Ser. No. 639,313, filed May 18, 1967, under the same title, which application is now abandoned.

BACKGROUND OF THE INVENTION

Various United States patents have been granted me disclosing and claiming multiple entry injection or stitch pumping of animal carcasses on the killing floor while still warm and flaccid and before rigor mortis with various solutions in amounts from 1 to 3% by weight of the carcass at animal body temperatures and at pressures from 40 to 100 lbs. per square inch. For example, U.S. Pat. No. 2,852,391 discloses such a process employing solutions of enzymes derived from the mold Thamnidium. U.S. Pat. No. 2,961,321 discloses the same general process in which the solution contains sterilized mycelium of Aspergillus, U.S. Pat. No. 2,990,020 uses an injection medium containing the animal enzymes trypsin and pepsin. U.S. Pat. No. 3,006,768 discloses the use of water at approximately 100° F. which is pumped directly into the muscles to promote hydrolytic activity of the natural enzymes during normal aging of the meat. U.S. Pat. No. 3,016,301 is limited to yearling lambs and mutton injected with a solution containing monosodium glutamate with subsequent heating of the carcass to an internal body temperature of approximately 108 to 115° F. In these patents, as in the present concept, the muscle bundle fibers are uniformly penetrated, saturated and separated by the fluid.

SUMMARY OF THE INVENTION

Most unexepectedly, I have now found that if products naturally occurring in animals be stitch pumped into the animal carcass while still warm and flaccid and prior to the completion of rigor mortis under the general conditions which I have previously taught, a synergistic action occurs in which the enzymes in the naturally occurring animal products act with the enzymes in the meat to produce more tenderness, more juiciness, better flavor and, in most instances, an improved appearance of the meat. The naturally occurring animal products which I have used in accordance with the present concept are blood from the aorta of the animal; whole blood from a similar animal; reconstituted dried blood; milk; and reconstituted milk from dried milk.

It is therefore the object of the present invention to provide a novel process for treating animal carcasses on the killing floor while still warm and flaccid and before rigor mortis to make the meat more tender, more flavorful and more moist when cooked and of better appearance by stitch pumping a fluid containing natural animal products into the muscles of the carcass.

If desired, the various solutions coming within the present concept may include such additives as salt, sugar, and gelatin which are also present in the animal and the beef, the amount of the additives being proportional or isotonic with the naturally occurring substances in the animal or meat.

When blood from the animal is employed as the fluid to be stitch pumped into the carcass, the blood may be taken from the aorta directly into a sterile container without exposing the blood to air and the blood is then stitch pumped into the carcass at the indicated needle pressures.

The various naturally occurring animal products of this invention have been extensively tested on the killing floor and, after stitch pumping into half of the carcasses and then chilling or "hanging," have been subjected to organoleptic testing by comparison with the mate side of the carcass. Invariably, steaks and roasts from the treated side have been found to have an improved tenderness, flavor and juiciness after cooking and usually exhibited improved raw cooked red meat color. In some of the tests using milk, the muscle pigment coloring, myoglobin, of the meat was somewhat lighter in color than the mate or control and some of the cuts of the treated beef resembled milk-fed veal more than corn or grass fed beef. This would be highly advantageous in certain markets, and especially so with "yearling" beef.

When using blood from the aorta, it is not necessary to use additives to prevent the blood from oxidizing or coagulating. The use of reconstituted blood does not require antioxidants or anticoagulants. Most unexpectedly, I have found that when blood is used as the injection fluid, the treated meat does not become "bloodshot." Of course, if the blood is injected into the freshly slaughtered carcass under pressures higher than about 110 lbs. per square inch at the needle, a bloodshot condition may be created since at this pressure the muscles are ruptured but this would be true with any of the injection fluids which I have used.

As disclosed in my prior patents, best results have been obtained with injection pressures of from 15–110 lbs. per square inch and using from 1 to 3% and not over 5% by weight of the meat of injection fluid. In the present concept a preferred pressure range is from 15 to 40 lbs. per square inch. When using blood from the aorta of the animal, it is usually not necessary to heat this blood to approximate animal body temperature which may range from 98 to about 106° F. depending upon the condition of the cattle and the method of slaughter. A drop in temperature of the aorta blood of only 2 or 3° F. to the point of injection has been experienced in testing and such a minimal drop in temperature requires no rewarming of the blood. Whole blood from a similar animal, reconstituted blood, chilled whole milk, or reconstituted milk preferable require heating to 90 to 106° F. to approximate the animal body temperature of the carcass to prevent any conjealing of the albumin in the meat and to facilitate dissemination of the fluid.

DESCRIPTION OF THE PREFERRED EMBODIMENTS

In an embodiment of the present concept, a steer carcass weighing 600 lbs. dressed was split into sides and the left side of the carcass was stitch pumped, in known manner, at pressures from 15–40 lbs. per square inch with 3% by weight of blood from the aorta while the treated half was still warm and flaccid and before rigor mortis. About 9 lbs. of blood was used and the two halves were then cooled in conventional manner. After chilling in the cooler, the treated side and the mate side were cut into retail portions and mate portions were cooked and subjected to organoleptic testing. There was a slight improvement in color between the pumped meat and the unpumped meat. The eating tests indicated that the treated meat was somewhat more tender, was more juicy and had a richer flavor than the untreated meat.

A similar steer carcass was halved and stitch pumped with an aqueous solution of freeze-dried blood hydrated to consistency of normal blood. About one gallon of this reconstituted blood, to which was added one ounce each of gelatin, salt and sugar, was then stitch pumped at the same pressures into the left half of the carcass and both sides were then placed in the cooler. After cooler "hanging," mate samples were taken from the treated half and from the untreated half, cooked and subjected to organoleptic testing. The organoleptic tests provided results which were the same as in the embodiment above using fresh blood from the aorta.

In the embodiment employing freeze-dried blood, the reconstituted blood was heated to animal body temperature and pressures of about 40 to 100 lbs. per square inch at the needle were used.

With the reconstituted blood used in the second embodiment of the present concept, vitamin C in appropriate amount may be used as an antioxidant.

The unexpectedly good results obtained using blood and reconstituted blood may be due to the cattle enzymes in the blood cooperating synergistically with the beef enzyme, Cathepsin, in the myoglobin and tissues of the meat which together create a high degree of comparative tenderness of the treated and cooked meat.

In another embodiment of the present concept a freshly slaughtered beef carcass was halved and the left side was injected with whole milk in amounts approximating 2% by weight, or 6 lbs. per 300 lb. side, with the milk at animal body temperature and injected at pressures of about 15–40 lbs. The mate side was used as a control and both sides were then placed in a cooler. After a suitable time in the cooler, approximately 5 days, steaks from the treated side and from the mate or control side were cooked and subjected to organoleptic testing. A marked improvement in tenderness and juiciness was noted in the treated steaks. When using whole milk, a lightening of the color of the meat may be experienced but no dilution of the red color of the meat has been noticed when using an injection solution of dried milk powder and water.

The unexpectedly improved tenderness of the meat when stitch pumped with milk and a reconstituted milk may be due to the natural enzymes in the milk and reconstituted milk cooperating synergistically with the natural enzymes in the myoglobin and in the muscle tissues of the meat.

It is now apparent from the above that the present invention provides novel processes in which naturally occurring animal products are stitch pumped into carcasses on the killing floor which markedly improves the flavor, tenderness and juciness of the meat when cooked and improves the appearance of the treated meat.

Changes in the illustrative embodiments of the present process discussed above may now occur to those skilled in the art without departing from the present inventive concept. Reference therefore should be had to the appended claims to determine the scope of this invention.

I claim:

1. In a method for increasing the tenderness and juiciness of cooked meat in which a fluid is added in the muscle portion of the meat by multiple entry injection of 1–3% by weight under pressure of from 15 to 110 lbs. per square inch and at a temperature approximating animal body temperature directly into the muscle of freshly slaughtered animals while warm and flaccid and before completion of rigor mortis wherein the improvement comprises the injection of a fluid containing naturally occurring animal products selected from the group consisting of blood from the animal; whole blood from a similar animal; reconstituted blood; whole milk; and reconstituted milk; whereby the muscle bundle fibers are uniformly penetrated, separated and saturated by the fluid whereby the natural enzymes in the fluid and in the meat act together and synergistically during normal aging of the meat thereby increasing the tenderness and juiciness of the meat in the cooking process.

2. The method as described in claim 1, the fluid being blood and the pressure being from 15 to 40 lbs. per square inch.

3. The method as described in claim 1, the fluid being milk and the pressure being from 15 to 40 lbs. per square inch.

References Cited

UNITED STATES PATENTS

| | | | |
|---|---|---|---|
| 3,047,395 | 7/1962 | Rusoff et al. | 99—107X |
| 3,122,440 | 2/1964 | Williams | 99—107 |

HYMAN LORD, Primary Examiner